Patented Jan. 9, 1951

2,537,762

UNITED STATES PATENT OFFICE 2,537,762

PRESERVATION OF PROTEINS

James Victor Hunn, Avon Lake, and Joseph I. Weeks, Lakewood, Ohio, assignors to The Sherwin-Williams Co., Cleveland, Ohio, a corporation of Ohio No Drawing. Application December 22, 1947, Serial No. 793,328

10 Claims. (Cl. 260—112)

This invention relates to methods of preserving proteins and more particularly to methods of incorporating preservative agents in proteinaceous products to render the preservation thereof more effective, and to the products of such methods.

Proteins and proteinaceous products are generally recovered from animal or vegetable sources by processes which produce neutral or acidic aqueous slurries or pastes of the insoluble proteins which have a consistency similar to that of cottage cheese. This product generally contains about 75% water and about 25% proteins.

When proteins are in the wet state, they are particularly susceptible to putrefaction, especially when the ambient temperature is above about 70° F. Such putrefaction of the proteins can be largely prevented by the use of refrigeration or sterilization, but both of these methods are impractical and expensive when handling large quantities of protein products.

The problem of inhibiting or retarding the putrefaction of proteinaceous materials has been approached in several different ways. For example, putrefaction is substantially retarded when most of the water is removed from the slurry, as by evaporation, so that the final product does not contain more than about 10% water. This method of retarding putrefaction, besides being expensive and tedious, has the serious disadvantage of impairing some of the most desirable characteristics of the protein material, i. e. it impairs its dispersibility, thus rendering it unsatisfactory for many commercial uses.

Further efforts to avoid putrefaction without impairing the properties or characteristics of the proteins were made by adding various preservative agents to the protein product. The preservatives were incorporated in the protein slurry by stirring or other mechanical mixing which resulted in such nonuniform dispersion throughout the mass that putrefaction was only partially inhibited.

According to the present invention, these difficulties are overcome and a stable product is obtained. By the present method a small quantity of a preservative compound can be thoroughly and uniformly dispersed throughout the proteinaceous material so that putrefaction thereof is most effectively retarded or inhibited.

It has been found that various compounds are particularly effective for inhibiting putrefaction of proteins. These include substituted benzene compounds such as benzoic acid and derivatives thereof. For example, the halogen and hydroxy derivatives of benzoic acid, i. e. chlor benzoic acid, brombenzoic acid, salicyic acid and the like are effective. Also phenol and derivatives thereof, such as phenyl phenol, the halogenated phenols and mono- and poly-halogenated phenyl phenols, i. e. orthophenylphenol, 2,4,5-trichlorphenol, 2,3,4,6-tetrachlorphenol, pentachlorphenol, and 2-halo, 4-phenyl phenol are effective for inhibiting putrefaction of proteins.

The preservative compounds or agents mentioned above are substantially soluble in alkaline solutions and, as previously mentioned, are substantially insoluble in neutral or acidic solutions.

As is known, most of the more common classes of proteins are dispersible or substantially soluble in aqueous alkaline solutions and are substantially insoluble in aqueous acidic solutions. This fact has been utilized in the commercial recovery of proteins from their natural sources, as shown, for example, in the process described in U. S. Patent No. 2,502,484 of Harold F. Saunders, entitled Process for Removing Solvent from Solvent-Wetted Vegetable Residues. In that process the proteins are extracted by treatment with an aqueous alkaline solution and are subsequently precipitated by acidifying the solution.

Broadly speaking, the preservative agent either in solid form or in a previously prepared alkaline solution is added to the protein while it is solubilized in an alkaline solution. Since the preservative is soluble in alkaline solutions, it will become thoroughly and uniformly dispersed throughout the solution simply by stirring the solution for a brief period. When the process for producing proteinaceous materials involves the step of solubilizing the proteins in an aqueous alkaline solution followed by precipitation by an acidic solution (as described, for example, in the aforementioned U. S. Patent No. 2,502,484), the preservative agent may be added directly to the alkaline solution of solubilized proteins. However, in other processes the proteins can be solubilized in an alkaline solution specifically for the purpose of adding the preservative agent and subsequently acidifying the solution.

After the preservative agent has been dissolved in and thoroughly mixed with the protein solution, the solution is acidified by adding dilute acid to lower the pH value of the solution to that value at which there is substantial precipitation of the proteins. Generally substantially all of a protein material will be solubilized when the alkaline solution has a pH value of from about 8 to about 13. Increasing amounts of the protein will be precipitated as the pH value is lowered, and at pH values of from about 3 to about 5 maximum quantities of the protein will be precipitated. When the protein and preservative solution is acidified, the preservative, which is also insoluble in acid solutions, will be co-precipitated with the proteins. As a result, the preservative will be distributed uniformly throughout the mass of precipitated proteins so that putrefaction will be substantially entirely inhibited for long periods of time. After separating the precipitated proteins and preservative from the bulk of the acidulated liquid by settling and decantation or filtering, etc., there remains the slurry or paste which contains about 75% acidulated water. This slurry will remain fresh and stable while being shipped or stored for long periods of time. Drying to a lower moisture content, refrigeration or sterilization are not required. Even though the protein slurry contains about 75% water, it is, nevertheless, more economical to ship the slurry in that condition than it is to dry the slurry to about 10% moisture content and ship the dried product. In addition, the protein has not been impaired or denatured by the high temperatures required for evaporating some of the water content. Furthermore, since proteins generally must be mixed with water or other aqueous vehicle before being used, the product of the present invention is ready for use without further treatment.

In order to inhibit putrefaction of the proteinaceous material under normal storage conditions, i. e., at room temperature and in the presence of unsterilized air, it is generally sufficient to add about 1 to 2% by weight of the preservative based on the amount of protein in the final product. This amount may be increased to from 10 to 15%, without injury or harm to the protein materials, when the conditions of storage or shipping are more severe, i. e. at higher temperatures, which normally accelerate putrefaction. Also the amount of preservative required will vary to some extent depending on the nature and source of the protein.

As an example, castor bean proteins were solubilized in a sodium hydroxide solution having a pH value of about 11. To this solution an amount of tetrachlorphenol was added so that the concentration was 11% based on the amount of protein which would subsequently be precipitated by acidification of the solution. A 5% aqueous solution of sulfuric acid was then added until the pH value was about 3.9, the value at which there is maximum precipitation of the solubilized castor protein. The tetrachlorphenol was co-precipitated with the protein and was uniformly dispersed throughout the mass of protein material. The excess liquid was then removed by filtration. The resulting product contained about 75% acidified water and about 25% protein and preservative.

For testing the effectiveness of the preservative, the above product containing tetrachlorphenol was innoculated with putrid protein, which would normally accelerate putrefaction manyfold. The innoculated product was stored in the presence of air and at room temperature. After 5 months, the product showed no signs of putrefaction.

By way of comparison a similar protein product without the preservative was innoculated with putrid protein and stored under the same conditions. This product was completely spoiled in 48 hours.

The alkaline solution in which the protein materials are solubilized may be sodium hydroxide, potassium hydroxide, ammonium hydroxide, or other water soluble alkaline compound or an alkaline reacting compound, such as sodium, potassium or ammonium carbonate or sulfite and the like.

The precipitation of the proteinaceous material and preservative agent from the alkaline solution can be effected by the addition of aqueous solutions of sulfuric, hydrochloric, sulfurous, or acetic acid or by an acid reacting compound such as $SO_2$ gas or acidic salts.

What we claim is:

1. A method of retarding putrefaction of proteinaceous materials comprising solubilizing the proteinaceous material in an aqueous alkaline solution, adding an amount of a protein preservative sufficient to retard putrefaction of said material under expected conditions of storage, said preservative being substantially soluble in aqueous alkaline solutions and substantially insoluble in aqueous neutral or acidic solutions, adding an aqueous acidic solution to lower the pH value of the solution to coprecipitate at least some of the proteinaceous material with preservative and adjusting the proportion of water in the precipitated proteinaceous material to not less than 10%.

2. A method as claimed in claim 1 wherein the amount of preservative added is not less than about 1% by weight based on the amount of precipitated proteinaceous material.

3. A method as claimed in claim 1 wherein the preservative is a substituted benzoic acid.

4. A method as claimed in claim 1 wherein the preservative is a substituted phenol.

5. A method as claimed in claim 1 wherein the preservative is a poly-halogenated phenol.

6. A method as claimed in claim 1 wherein the preservative is tetrachlorphenol.

7. A method as claimed in claim 1 wherein the preservative is pentachlorphenol.

8. A method as claimed in claim 1 wherein the preservative is ortho phenylphenol.

9. A method of retarding putrefaction of proteinaceous materials comprising solubilizing proteinaceous material in an alkaline solution having a pH value of from about 8 to about 13, dissolving in said solution from about 1% to about 15% by weight of a protein preservative, based on the amount of protein to be precipitated, said preservative being substantially soluble in aqueous alkaline solutions and substantially insoluble in aqueous neutral or acidic solutions, adding an amount of an aqueous acidic solution sufficient to reduce the pH value of said solution to a value at which a substantial quantity of proteinaceous material will be coprecipitated together with the preservative and adjusting the proportion of water in the precipitated proteinaceous material to not less than 10%.

10. A stable proteinaceous material comprising at least 10% of an aqueous medium, insoluble proteinaceous material and an insoluble protein preservative uniformly distributed therethrough, said proteins and preservative having been coprecipitated from an alkaline solution by reducing the pH value of said alkaline solution to a value at which at least a portion of said protein and said preservative is insoluble.

JAMES VICTOR HUNN.
JOSEPH I. WEEKS.

REFERENCES CITED

The following references are of record in the file of this patent:

UNITED STATES PATENTS

| Number | Name | Date |
|---|---|---|
| 2,233,213 | Kniseley et al. | Feb. 25, 1941 |
| 2,280,546 | Schuler | Apr. 21, 1942 |
| 2,436,239 | Weisberg et al. | Feb. 17, 1948 |

OTHER REFERENCES

Sutermeister, "Casein and Its Industrial Applications," Reinholt Pub. Co., New York, 2nd Ed. (1939), p. 339.